(12) United States Patent
Denk et al.

(10) Patent No.: US 7,934,778 B2
(45) Date of Patent: May 3, 2011

(54) COMPOSITE WHEEL RIM

(76) Inventors: Peter Denk, Freiburg (DE); Thomas Fuderer, Freiburg (DE)

( * ) Notice: Subject to any disclaimer, the term of this patent is extended or adjusted under 35 U.S.C. 154(b) by 313 days.

(21) Appl. No.: 11/681,173

(22) Filed: Mar. 1, 2007

(65) Prior Publication Data
US 2007/0205654 A1  Sep. 6, 2007

(30) Foreign Application Priority Data

Mar. 3, 2006  (DE) .......................... 10 2006 010 445

(51) Int. Cl.
*B60B 5/02* (2006.01)
(52) U.S. Cl. .............. 301/95.103; 301/95.107
(58) Field of Classification Search ............ 301/64.701, 301/64.702, 64.703, 64.706, 95.102, 95.103, 301/95.104, 95.106, 95.107, 65; 152/382, 152/383
See application file for complete search history.

(56) References Cited

U.S. PATENT DOCUMENTS

| | | | | | |
|---|---|---|---|---|---|
| 3,357,747 | A | * | 12/1967 | Eldred | 301/64.706 |
| 3,528,706 | A | * | 9/1970 | Bauer | 301/65 |
| 4,017,348 | A | * | 4/1977 | Shumaker | 156/189 |
| 4,173,992 | A | * | 11/1979 | Lejeune | 152/381.3 |
| 4,483,729 | A | * | 11/1984 | Fujisaki et al. | 156/222 |
| 5,045,261 | A | * | 9/1991 | Weeks | 264/108 |
| 5,985,072 | A | * | 11/1999 | Finck et al. | 156/184 |
| 6,425,641 | B1 | * | 7/2002 | Herting | 301/58 |
| 6,926,370 | B2 | | 8/2005 | Spoelstra | |
| 6,991,300 | B2 | * | 1/2006 | Colegrove | 301/95.103 |
| 2005/0062337 | A1 | * | 3/2005 | Meggiolan et al. | 301/95.102 |
| 2006/0267397 | A1 | | 11/2006 | Possarnig et al. | |
| 2007/0194619 | A1 | * | 8/2007 | Colegrove et al. | 301/95.101 |

FOREIGN PATENT DOCUMENTS

| | | |
|---|---|---|
| GB | W1499893 | 2/1978 |
| WO | WO 96/25296 | 8/1996 |
| WO | WO 97/18098 | 3/1997 |

* cited by examiner

*Primary Examiner* — Russell D Stomer
(74) *Attorney, Agent, or Firm* — Garcia-Zamor IP Law; Ruy M. Garcia-Zamor

(57) ABSTRACT

In a wheel rim including fiber reinforced composite material and preferably having lateral rim sidewalls that may include rings.

27 Claims, 14 Drawing Sheets

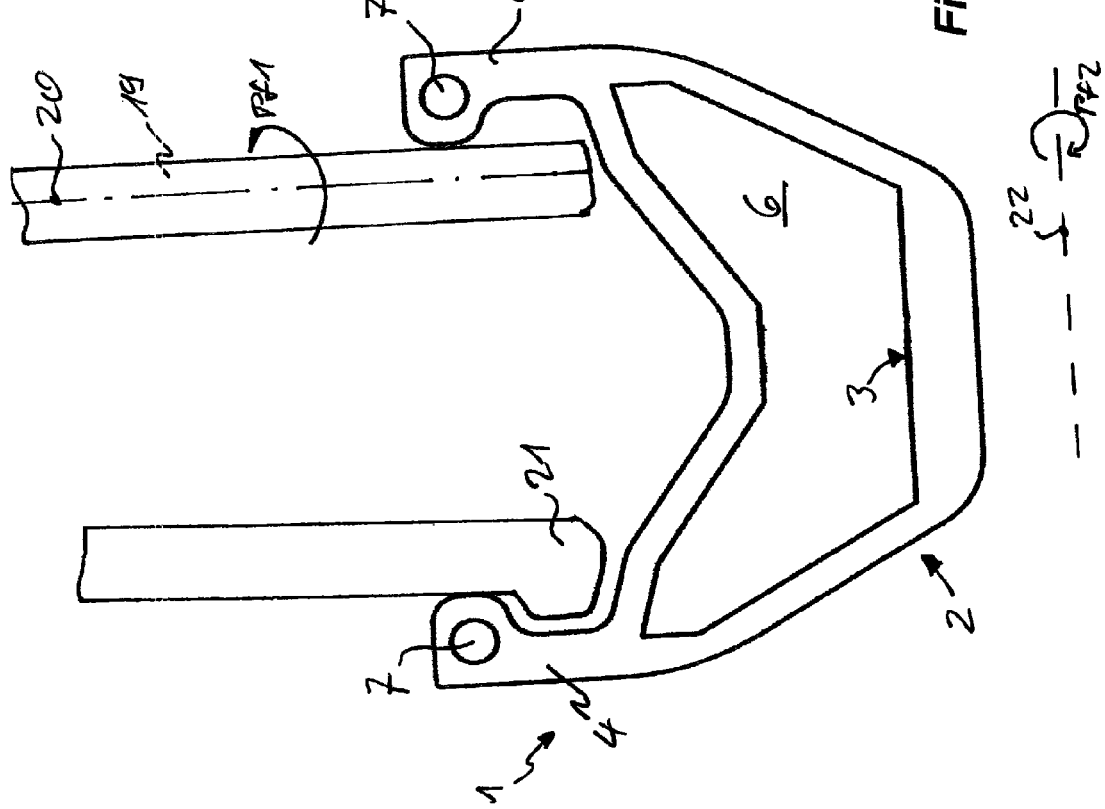

COMPOSITE WHEEL RIM

PRIORITY CLAIM

This application claims priority under 35 U.S.C. §119 to German Patent Application 10-2006-010-445.2-21 which was filed on Mar. 3, 2006.

BACKGROUND

The invention relates to a wheel rim having a rim body, made particularly of fiber reinforced composite, which rim body has a rim well and two lateral rim sidewalls.

DETAILED DESCRIPTION OF THE PRESENT INVENTION

Figure 1:
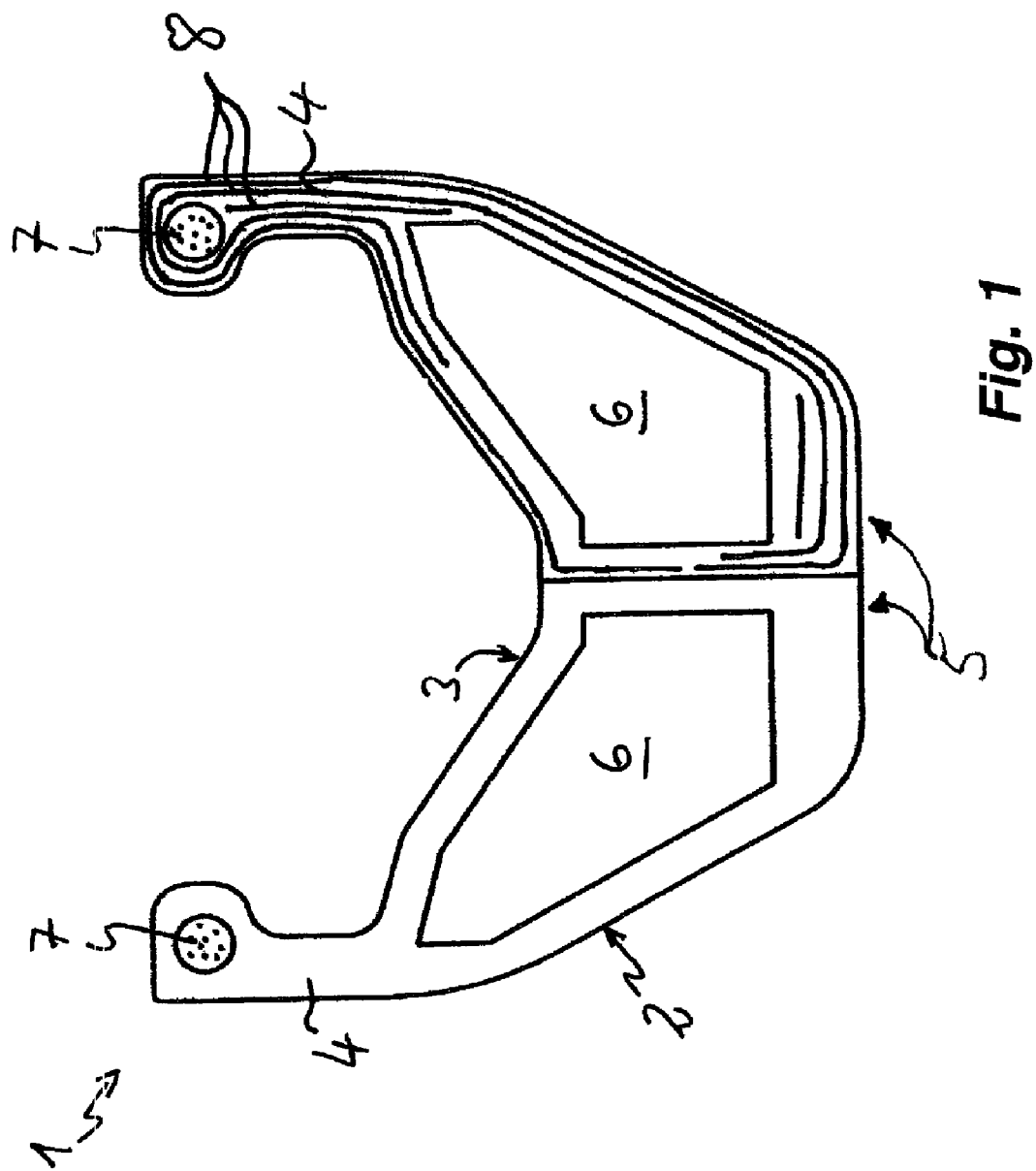
FIG. 1 a cross section of the rim profile of a wheel rim, which is made of two pieces and whose rim sidewalls are designed as rim flanges, within each of which flanges an encircling ring is mounted, FIG. 2 a detail representation of a rim sidewall of the rim profile from FIG. 1, FIG. 3 a cross section of a rim piece, FIG. 4 the rim profile of two rim pieces, connected together to form a wheel rim, which pieces are provided with fiber mats in their contact areas, FIG. 5 a perspective view of a piece of a rim piece, which piece shows cutouts separated by partition walls in its contact side, which contacts a second rim piece.

A wheel rim holds a tire, generally with a tube, and is connected by means of spokes with a hub and via this hub with a vehicle. There are also wheels, in which the rim, together with the hub and spokes, form a unit made of plastics or fiber reinforced composites.

Superior rims have a cavity and a high profile (sidewall, flange) in order to achieve a better ratio between rigidity and weight. The profile shape is conventionally constructed initially as an extrusion, bent into the circular form, and the rim butt, that is, the contact areas of the profile shape, is welded or tacked.

Various types of wheel rims are differentiated. Clincher rims have rim sidewalls designed as rim flanges in order to laterally hold a clincher tire. This type of rim exists with non-sealed spoke holes for use with tubed tires and with sealed spoke holes or with a sealed rim well for tubeless tires. In both types, the tire is held to the rim by the rim flange.

In tubed tire rims, the tube forms a unit with the tire. Usually, the tube is sewn into the tire. The tire is then firmly glued to the rim. The rim does not have rim flanges, but rather a slight depression for the formation of a contact surface between the tire and the glue. The lateral springing out of the tires is not prevented by a rim flange, but rather, for the most part, by the glue.

A wheel rim is primarily stressed by pressure and shear forces, which can lead to failure when insufficiently dimensioned. This is particularly critical in the sport of mountain biking, where rims are repeatedly exposed to strong blows from riding in rocky terrain and stresses from jumps. There exists, therefore, also a danger of buckling as well as damage and/or failure due to impact with rocks and percussion effects. In particular, the rim sidewalls or rim flanges are compromised, because stones, rock edges or curbstones can selectively compress the tire to such an extent that they strike directly on the rim sidewall at the respective point and can damage the rim sidewall. In addition, the rim sidewall can be loaded with lateral pressure due to inflation of the tube found in the tire, such that the rim sidewall can break. For rims made out of a fiber reinforced composite, which can only optimally accommodate loads in a particular direction corresponding with the fiber direction, the previously described critical load impacts can lead to delamination and thereby to damage of the rim sidewalls or of the entire rim.

The objective is therefore, to create a wheel rim of the type named initially, which is heavy duty even at its most external peripheral area (in the area of the rim sidewall), and, in spite of that, demonstrates a low weight.

The solution of this objective, according to the invention, is that the rim sidewalls are each formed by an encircling ring in the circumferential direction or have an encircling ring in the circumferential direction.

Due to the rings, the wheel rim's rigidity and the ability to resist pressure and buckling loads is increased, because these rings allow an improved load absorption in the critical load direction. In spite of this, the weight of the rim in comparison with previously known rims is not increased, or is increased only inconsequentially.

The wheel rim sidewalls can be formed directly by the rings, that means that the rings are applied directly to the rim body on both sides of the rim well and connected with it, for example being either glued or welded. But it is also possible to construct rim sidewalls in the conventional manner and to then strengthen these by the rings.

The sidewalls of rims, like those according to the invention, can also be designed as rim flanges in order to accept clincher tires.

The rings can be made, for example, out of aluminum or steel, whereby these demonstrate a high stability. Alternatively, the rings can be made out of at least one aluminum and steel.

Particularly in carbon rims, that is, rims of fiber reinforced composite, the rims can be made preferably of CFRP fibers, Kevlar, or another fiber reinforced composite. By this means, the ratio between stability and weight of the rim can be optimized, because, along with the stability and rigidity of the rim increased by the rings, the weight is only insignificantly increased by the lightweight rings of fiber reinforced composite.

The rings can be made of monodirectional fiber rovings or fiber mats. In order to increase the stability and rigidity for differing load impact directions, the rings can also be made of plies of differently oriented fiber rovings or fiber mats.

The rings can also be made of several, preferably overlapping, ring layers.

An additional increase in the rigidity of the rings can be achieved, when the rings are made of a pre-tensioned fiber roving. For this construction, the fibers can be rolled onto a drum under tension, and brought into a ring shape. For this, the preferred monodirectional 0°-fibers are employed.

A preferred embodiment provides that the rings are made of rolled up fiber mats. For this, variously oriented fiber mats (+/−20°) can be used, whereby variously oriented fiber mats can also be mixed together and used for a ring. These fiber mats or plies of fiber mats are rolled up into a longish "cigar shape" and applied to the rim body or to the rim sidewalls, ring-shaped, along the entire peripheral line.

Preferably, the rings each show a round, circle-shaped cross section. However, any other cross sectional form is conceivable. Similarly, the cross-sectional shape can vary over the course of the periphery, the 360° circular shape, for example, a round cross-section having various diameters.

It is particularly advantageous, if the rings are each surrounded by fiber material, which emanates from the respective rim sidewall, goes around the ring, and is led back to the rim sidewall. This fiber material, enclosing and surrounding the ring, particularly in the form of fiber mats, grants the rim sidewall an especially high rigidity and thus prevents the delamination of the rings and rim sidewalls to a particularly high degree.

During the production of the wheel rim, the fiber material can be processed with synthetic material that is not yet completely cured, so that the rings, made of fiber material, can be applied to the rim body or to the rim sidewalls, and they are firmly glued there by the synthetic material and are held roughly in the desired position. The rings are fixed in their final position by the application of the enclosing fiber webs.

The wheel rim made of fiber reinforced composite can be produced as a unit in a negative mold: by this process, the fiber material is inserted into the mold, the mold is sealed circumferentially with the molded part cores, and the fiber material is heated and thereby cured. For this, however, a number of cores are necessary in order to be able to subsequently remove the rim from the mold.

In order to simplify the production, the wheel rim can be constructed preferably of at least two parts, in particular, out of two pieces, fundamentally symmetrical relative to the radial plane of the rim. These pieces can be made in such a manner, that they each demonstrate no undercuts and thus can be manufactured in a simple, two-part negative mold.

The rim flange with the embedded ring can also be simply produced by a compression mold method.

The pieces of the wheel rim can be glued, welded, riveted together, and/or connected to each other by tacking. Preferably, the connection can result from a so-called "2 step layup" method.

For an optimal ratio between rigidity and weight of the wheel rim, the rim body can be formed as a cavity rim and have at least one cavity.

In the case of a multi-piece wheel rim, each of the rim pieces can have a cavity. It is also conceivable, that each rim piece has a cavity opening, whereby the open cavities of the individual parts dovetail into a closed cavity in the joined position.

The ratio between rigidity and weight of the wheel rim can be further optimized, if the interior facing contact surfaces of the rim pieces (which are symmetrical relative to the radial plane of the rim) each have cutouts divided from each other by partition walls These cutouts, through which the weight of the rim is further reduced, can already be provided for during the molding of the rim, or can be created later by reaming/milling out, machining, or by similar processing steps of the cured fiber material. The cutouts can preferably be made in the mold by elongated holes.

In order to optimize the rigidity of the rim in spite of the cutouts, the partition walls and the cutouts of the two rim parts lying next to each other, when mounted in joined position or position of use, are preferably offset from each other, so that each partition wall of one rim piece is mounted approximately at the mark of the mid-point of a cutout of the other rim piece. By the joining of the two rim pieces, a partition wall of one rim piece functions to stabilize the opposing cutout of the other rim piece.

Conventionally, the spokes of a wheel are fed through holes in the rim well. These holes may lead, however, to leakage problems in tubeless tires and make inflation of the tire impossible.

It is therefore particularly practical in rims for tubeless tires, if the rim has on its tire hub side (the peripheral side facing away from the rim well) essentially, radially protruding connecting flanges spaced in the circumferential direction. The spokes can be mounted on to these connecting flanges. Holes in the area of the rim well are then not required.

It is particularly advantageous, if the connecting flanges each have an insertion opening running perpendicular to the flat mid-plane of the rim. By means of these insertion openings, a fastening end of a spoke can be fed and fastened.

In a two-part wheel rim, partial flanges are provided on each rim piece, which partial flanges dovetail pair-wise in the standard position to one complete connecting flange. The insertion openings of such connecting flanges, which openings lie pair-wise next to each other, can be connected with rivets, for example, in order to increase the stability of the rim.

Particularly in multi-part wheel rims with rim parts that are symmetrical relative to the radial-plane, the problem occurs during the use of tubeless tires, that air can escape in the contact area of the two rim halves. In order to seal the affected area, and thus to securely prevent the escape of air, the tire hub side and/or the rim well side of the peripheral side of the rim can be subsequently provided with fiber mats, which fiber mats cover over the contact area of the rim parts.

To further increase the stability of the rim, particularly in the case of broadly set rim sidewalls, it is advisable, if partition walls were provided that proceed between the lateral rim side walls in the circumferential direction at regularly spaced intervals, or that an encircling support ring was provided between the lateral rim sidewalls. These partition walls or the continuous, encircling support ring form a connection with the opposing rim sidewall and prevent—each according to force effect—a compression or an expansion of the rim sidewalls relative to each other and thus prevent a delamination or similar damage to the rim. A continuous support ring forms in addition an internally closed contact surface for the tire or the tube.

The wheel rim according to the invention can be used in particular for bicycles and more specifically for mountain bikes and racing bicycles. It is conceivable also for use on similar other vehicles such as motorcycles or wheel chairs.

The invention relates further to a method for the production of a wheel rim.

The method according to the invention, wherein two rim pieces are each molded in a negative mold.

Whereby in the circumferential direction an encircling ring is mounted to each rim piece in the area of the rim sidewall, and the two rim pieces (following the curing and removal from the mold) are connected together at the interior sides mounted in the radial plane. The two rim pieces can be asymmetrical or symmetrical relative to the central radial plane of the rim in order to save on the cost of molding.

Further construction possibilities of the rim according to the invention and the method of production of a rim appear in the claims.

Subsequently, exemplary embodiments of the inventions are more fully described via the figures.

A wheel rim 1, so designated in all figures, which wheel rim 1, as represented in each of the corresponding figures, shows according to FIG. 1 a rim body 2 with a rim well 3 and with two lateral rim sidewalls 4. The rim sidewalls 4 are each designed as rim flanges and show an undercut area, in order to laterally hold a clincher tire (not represented). The lineations in the rim body 2 indicate that it is made of fiber reinforced material, thus is deals with a carbon fiber rim. In order to achieve a better ratio of rigidity to weight for the wheel rim 1, this wheel rim is designed as a cavity rim, whereby the wheel rim 1 is made of two rim pieces 5, in each of which pieces a cavity 6 is provided.

The rim sidewalls 4 are, particularly in the sport of mountain biking, exposed to extreme loads, whereby the hazards created by stones, rock edges or curbstones, in particular, can selectively compress the tire to such an extent, that they strike directly on the rim flange at the respective point and can damage it. In order to increase the rigidity and stability of the rim sidewalls 4, and to do this while only slightly increasing the weight of the wheel rim 1, an encircling ring 7 is built into each of the rim sidewalls 4, which are themselves designed as rim flanges.

Figure 2:
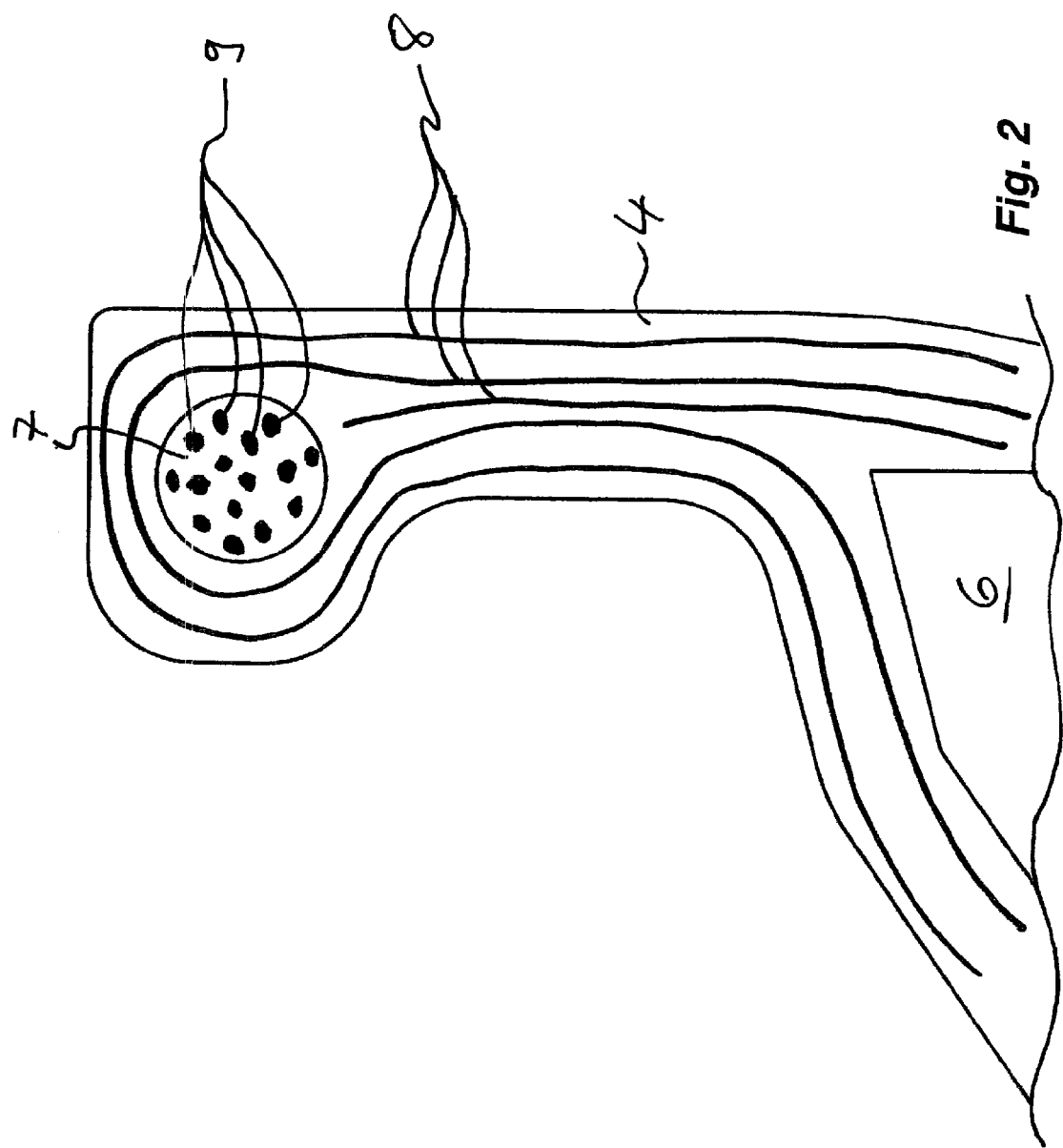

As is particularly visible in a rim sidewall 4 according to the detailed representation in FIG. 2, the ring 7 is enclosed in fiber mats 8 made of carbon fiber material, which mats emanate from the rim body 2 in the area of the rim sidewall 4, go around the ring 7 and reach back to the rim body 2. By means of this complete enclosure of the ring 7, there results the greatest possible rigidity of the rim sidewall 4 and a correspondingly high resistance to pressure and buckling loads. In the preferred embodiment represented in the figures, the rings 7 are each constructed of a multitude of encircling CFRP fibers 9. However, rings made of other materials, such as: other fiber reinforced composites; at least one of carbon fiber reinforced polymer (CFRP) fibers and fiber reinforced polymer; at least one of aluminum and steel; reinforced fiber composite wherein the reinforced fibers comprise annular fiber groupings that extend circumferentially along the associated lateral rim sidewall; at least one of monodirectional fibers and monodirectional fiber groupings; wherein the annular ring comprises at least one of plies of variously oriented fiber groupings and plies of variously oriented fiber mats wherein the annular ring is formed of a plurality of ring segments (which segments may be positioned to partially overlap); plastics; or metals such as aluminum or steel are also conceivable.

A further increase in the rigidity can be achieved, when the rings are constructed out of pre-tensioned CFRP fibers 9.

Figure 3:
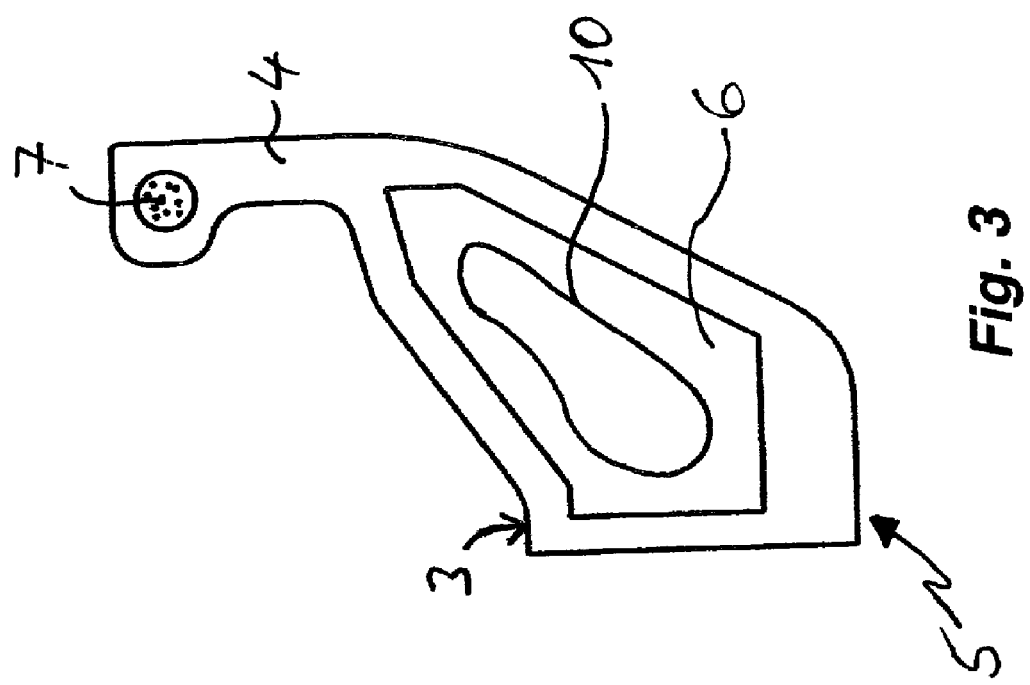

FIG. 3 shows a single wheel rim piece 5. From this representation it is clear, that such a rim piece 5 can be produced simply in a two-part negative mold with one right and one left part of the mold (relative to the representation) according to FIG. 3. The rim sidewall 4, constructed as a rim flange, can be molded without difficulty and no post-processing is required. The cavity 6 is formed by inflating a bladder 10 surrounded by fiber material, which bladder is represented in FIG. 3 in the unpressurized state, detached from the fiber material.

Such a rim piece 5 is connected relative to the radial central plane of the wheel rim 1 with a mirror symmetrical rim piece to form the complete rim 1 (FIG. 4), whereby the connection of the rim pieces 5 can result from gluing, tacking, riveting or a similar connection technology.

Figure 4:
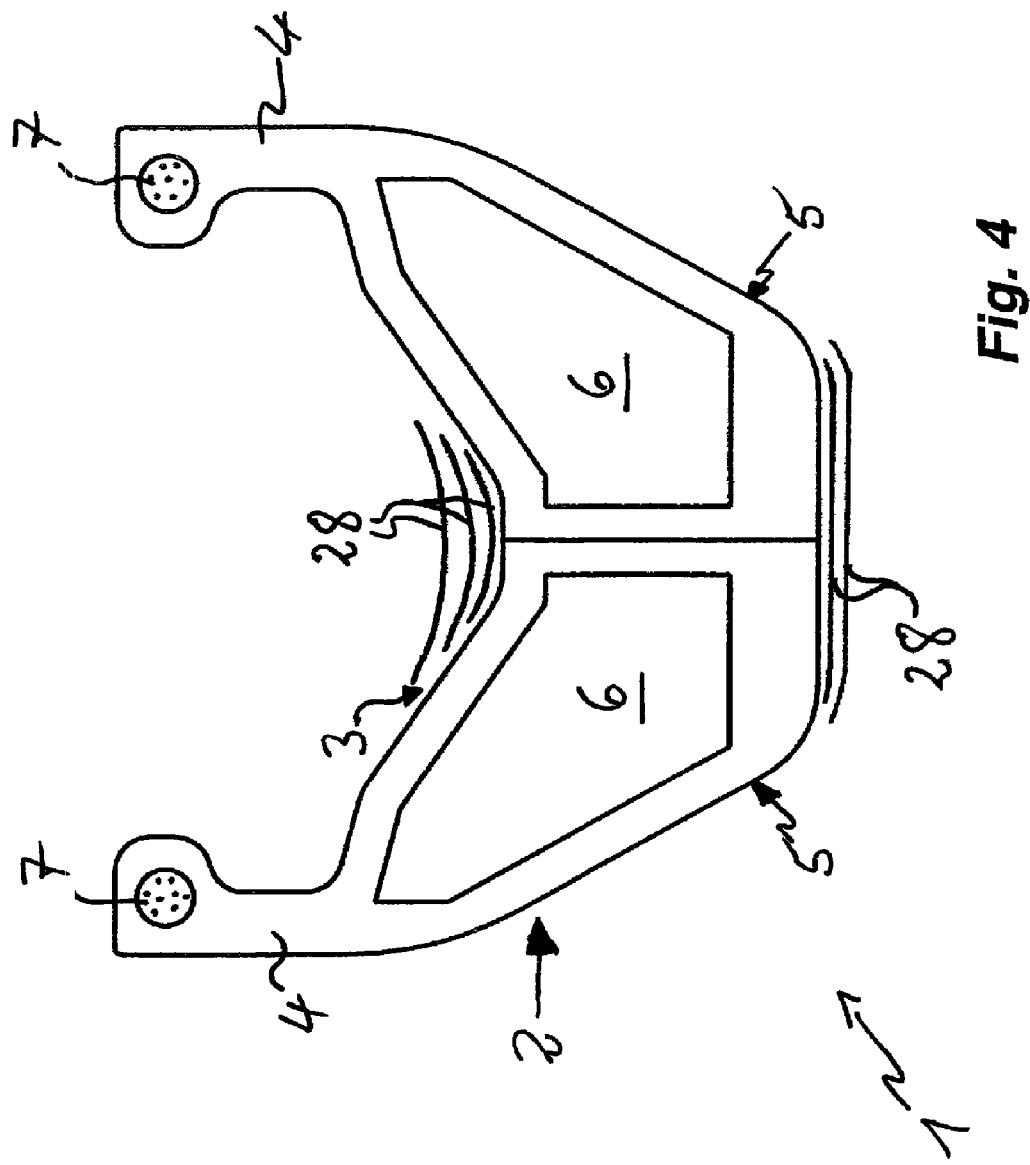

It is also indicated in FIG. 4, that the tire hub area and the rim well area of the peripheral side of wheel rim 1 are subsequently provided with fiber mats 28 or prepreg, which cover over the contact area or the connection area of the wheel rim pieces 5 and thereby seal them. By this means, the wheel rim 1 can also be used with tubeless tires, because an escape of air through the interface between the two rim pieces 5 is prevented.

Figure 5:
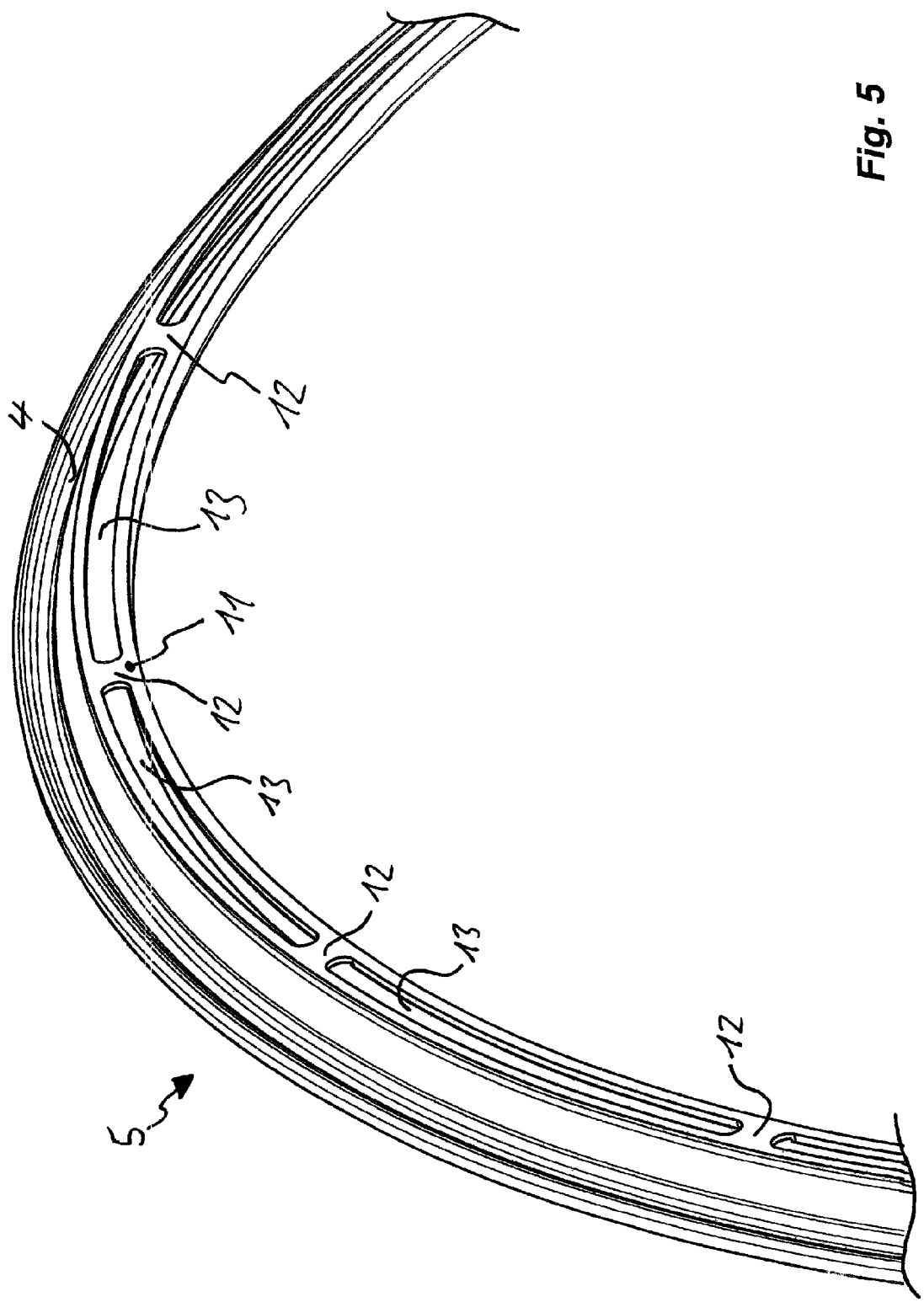
Figure 6:
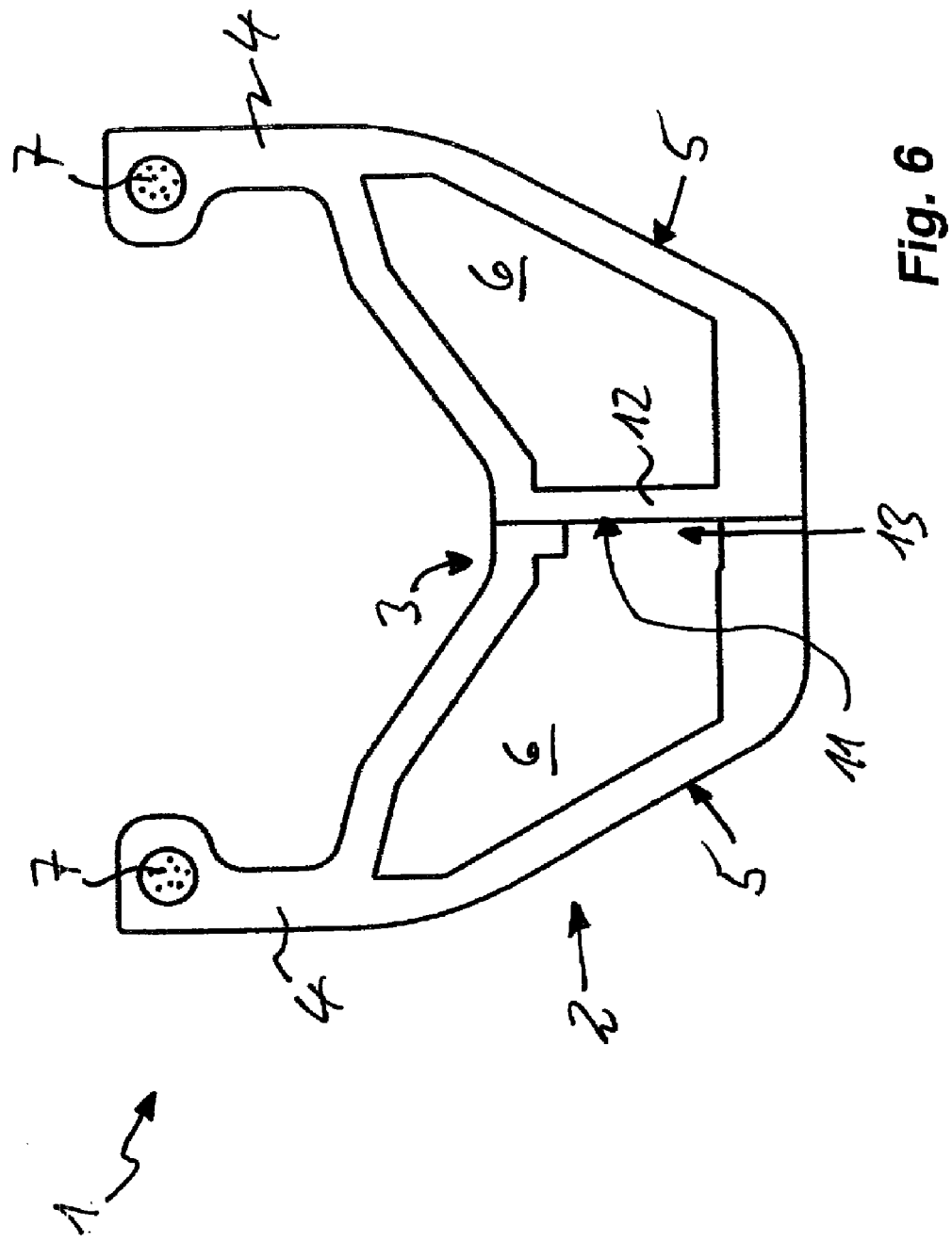
FIG. 6 a cross section of the rim profile of a wheel rim, whose rim pieces at their contact sides each show cutouts divided from each other by partition walls, whereby the cutouts of the two wheel rim pieces are mounted offset from each other, FIG. 7 a cross section of the rim profile of a wheel rim, having radially protruding connecting flanges on the lateral side facing away from the rim well, FIG. 8 the wheel rim from FIG. 7 having an additional, encircling support ring between the rim sidewalls, FIG. 9 a cross section of a rim blank, FIG. 10 a cross section of a rim blank, with represented tools indicated for the finish machining, FIG. 11 a cross section of a wheel rim in a negative mold with a three-part mold core, FIG. 12 a cross section of a wheel rim in a negative mold with a mono-part mold core, FIG. 13 a cross section of a rim blank, having a rim body with a cavity, and FIG. 14 a cross section of the rim blank from FIG. 13, machined to be a wheel rim with represented tools indicated for the finish machining.

FIG. 5 shows in a perspective representation a section of a rim piece 5, in which the interiorly lying contact side 11, which contacts the second rim piece, shows the cutouts 13 formed as elongated holes, each divided from the others by the partition walls 12. These cutouts 13 can be realized in the contact side 11 by milling or a similar form of material removal subsequent to the molding of the rim piece 5. By means of the cutouts 13, the weight of the wheel rim 1 can be further reduced in order to optimize the ratio between rigidity and weight. When connecting the two rim pieces 5 with each other, the cutouts 13 and the partition walls 12 are mounted preferably offset from each other (FIG. 6), so that in each case, a partition wall 12 of a rim piece 5 lies opposite to a cutout 13 of the other rim piece 5, by which means, the stability and rigidity of the rim was is again increased.

Conventionally, the spokes of a wheel are fed through holes in the rim well, which, particularly with tubeless tires is problematic relative to sealing.

Figure 7:
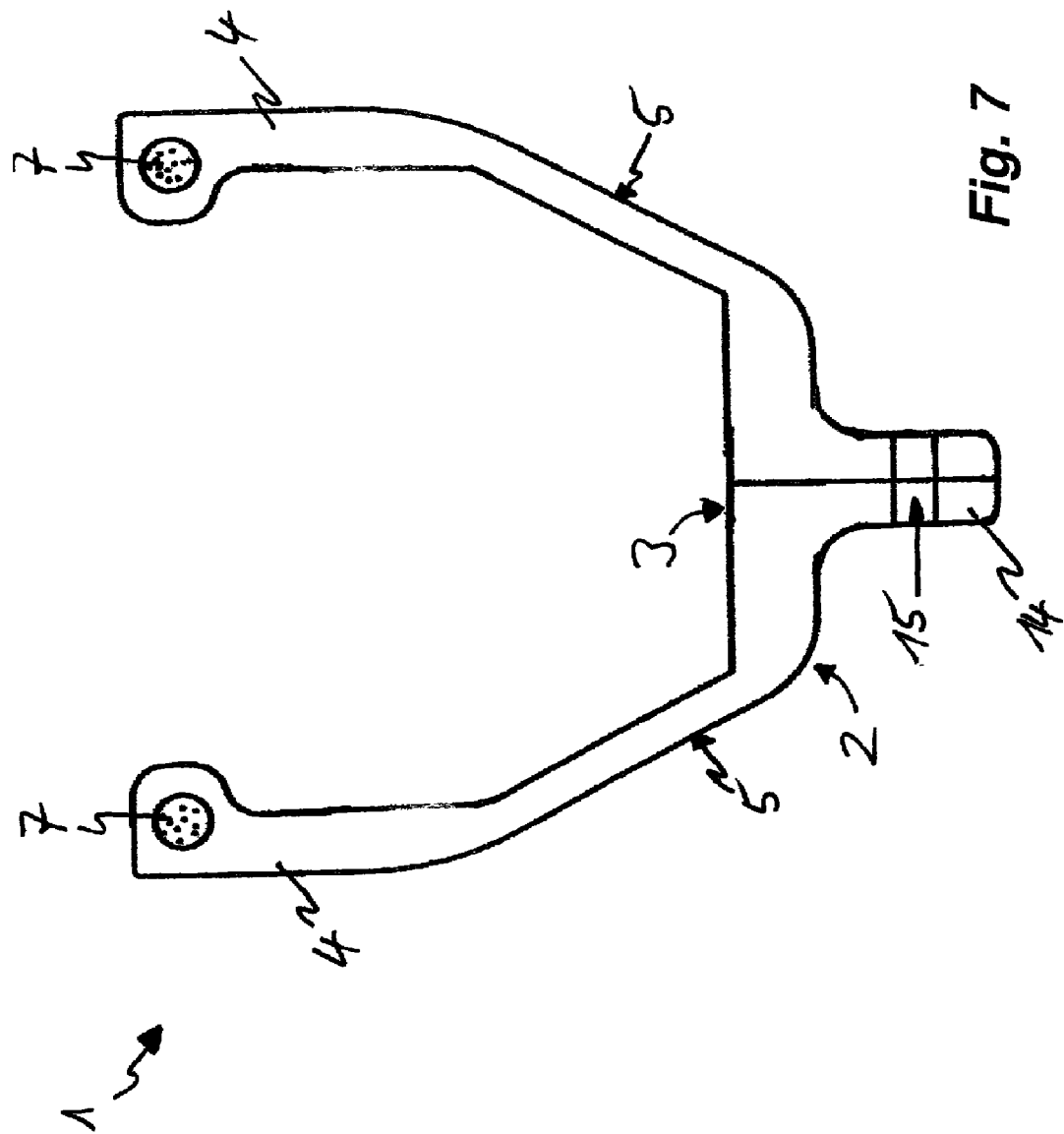

The wheel rim 1 according to FIG. 7 shows on its tire hub side (the peripheral side facing away from the rim well 3) radially protruding connecting flanges 14 spaced at regular intervals in the circumferential direction. A spoke (not represented) can be mounted on to each of these connecting flanges 14. For this purpose, the connecting flanges 14 each show a insertion hole 15 proceeding perpendicular to the radial central plane of the wheel rim 1. An angled spoke end can be fed through the insertion hole 15. Radial holes spaced along the periphery through the rim well 3 are therefore not required. If necessary, the insertion holes 15 can each be strengthened by a rivet, by which means the purchase of the two rim pieces 5 to each other is also improved. This rim can also, however, show the traditional holes or spoke holes.

Figure 8:
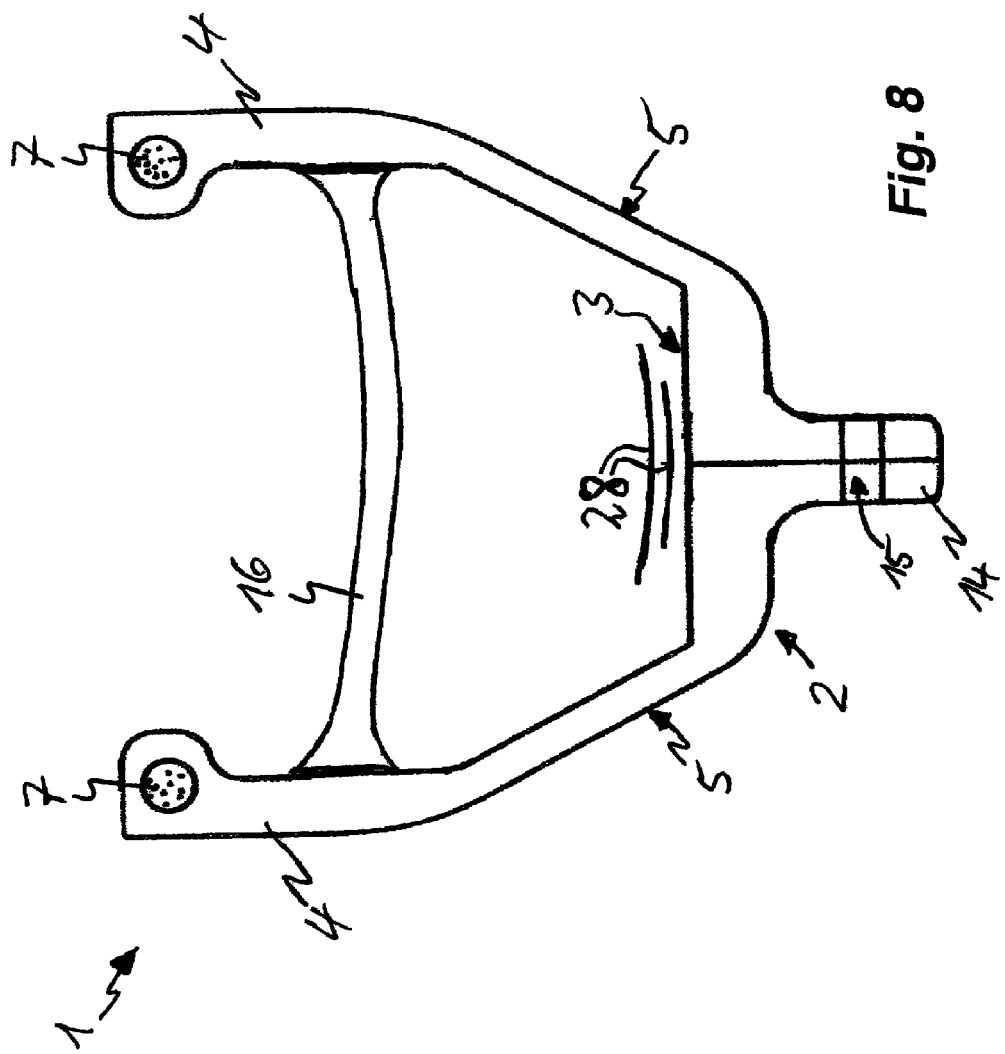

In FIG. 8, an encircling support ring 16 in the circumferential direction is provided, which ring connects the two rim sidewalls 4 with each other and thus prevents an excessive, undesired expansion of the rim sidewalls 4 on the one hand as well as a compression of the rim sidewalls 4 on the other hand, and thus increases the rigidity and the stability of wheel rim 1.

Figure 9:
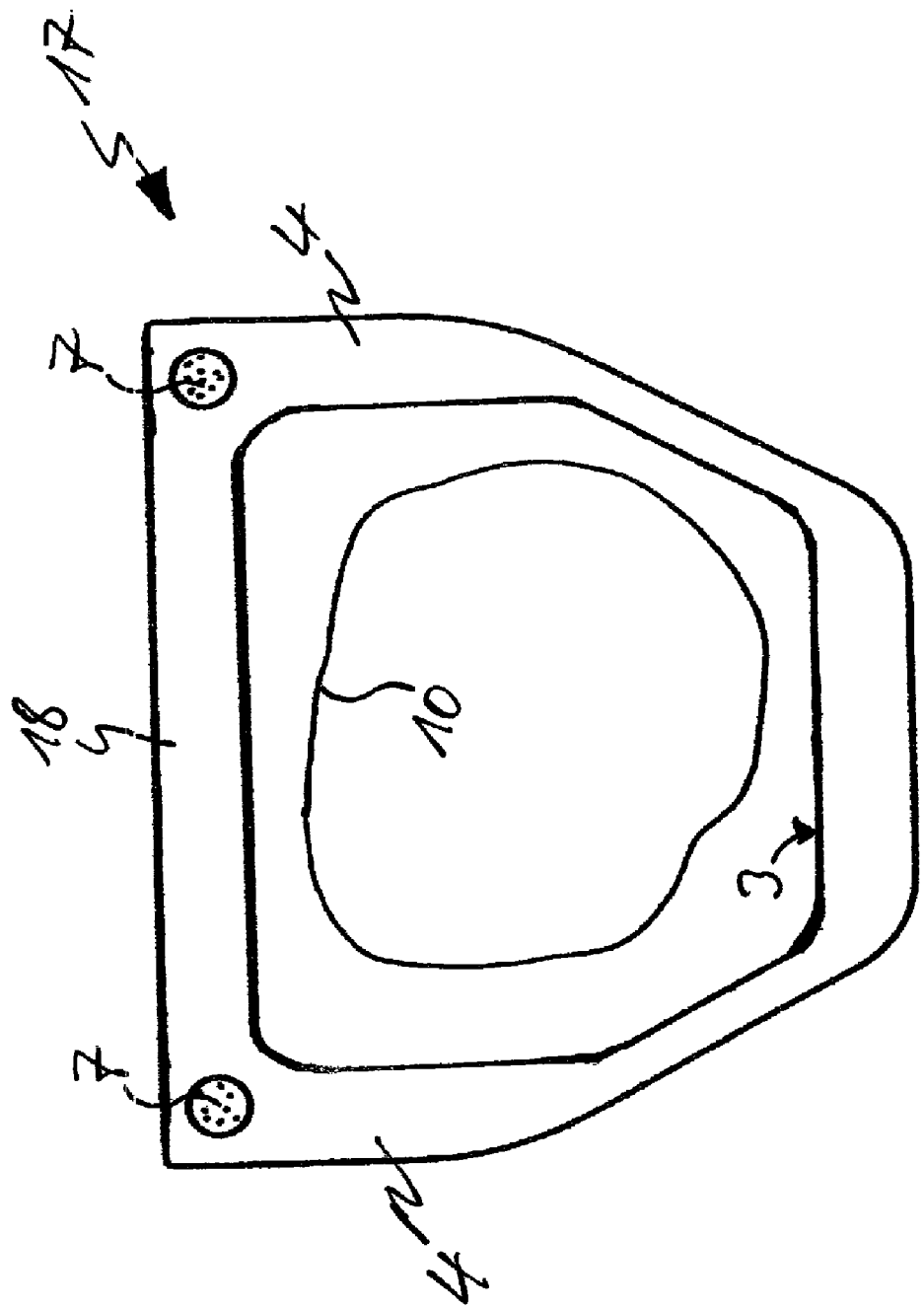

FIG. 9 shows a wheel rim blank 17, as it can be molded in a two-part negative mold. For the formation of the rim well 3 and the rim sidewalls 4, a bladder 10 is incorporated into the wheel rim blank 17, which bladder 10 is placed under pressure during curing, in order that the material surrounding it be brought into the desired shape. In FIG. 9, the bladder 10 is again unpressurized and has already detached from the fiber material.

In order to make a ready-to-use wheel rim out of the wheel rim blank 17, the external material partition wall 18 between the free ends of the rim sidewalls 4 has to be removed. This can occur by means of the indicated rotary grinder 19, schematically represented in FIG. 10. The rotary grinder 19 rotates around its central axis 20 (Pf1) and grinds away the wheel rim profile. To shape the rim sidewalls 4 designed as rim flanges, an angled cutting tool 21 can be provided, which cutting tool 21, during rotation (Pf2) of the rim 1 around its central axis 22, cuts away the surplus material in the area of the rim sidewalls 4. Central axis 22 corresponds to the hub axis, and in FIG. 10 (Pf2) is not represented to scale, relative to the distance to the rim body 2, but rather at a short distance away from the wheel rim blank 17. It is also possible, that instead of this cutting tool 21, a shaping cutter is provided, which cuts away the contours of the rim flange.

Figure 10:
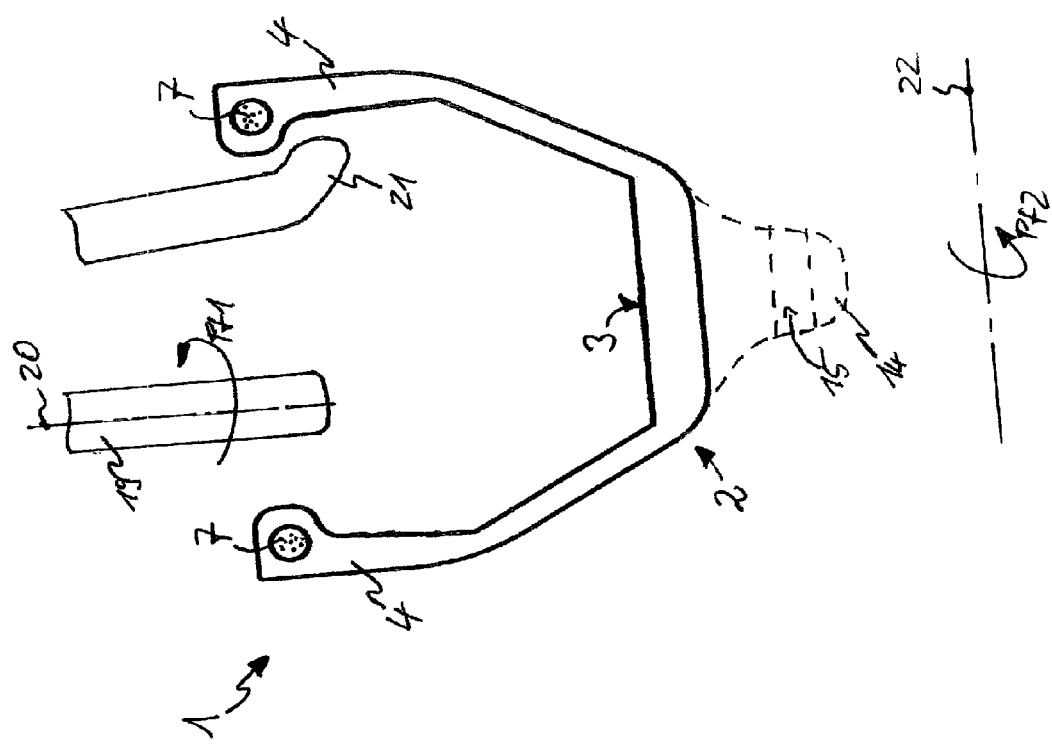
Figure 13:
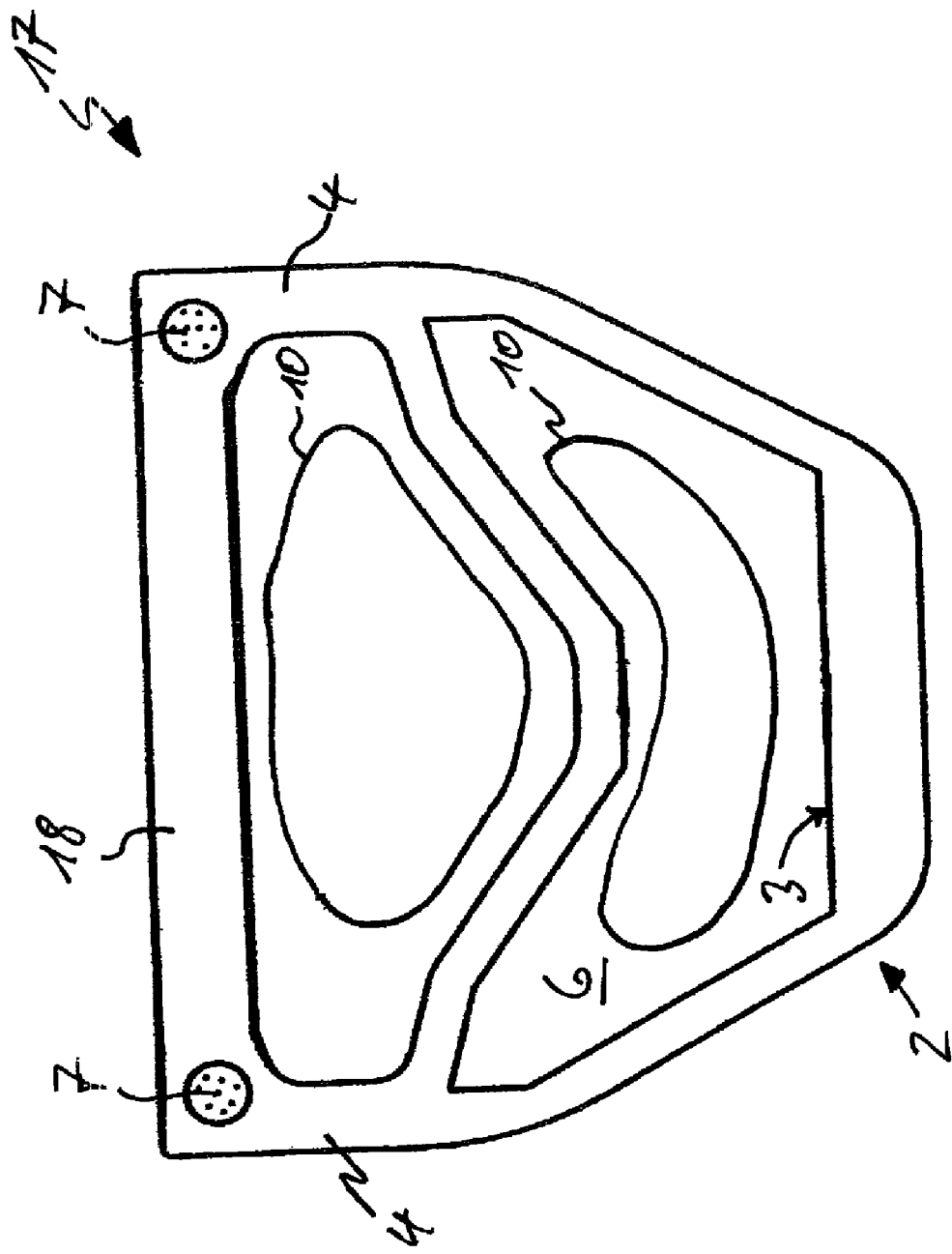

FIGS. 13 and 14 show a configuration similar to FIGS. 9 and 10, whereby the wheel rim 1 or the wheel rim blank 17 is designed as a cavity rim and shows an additional cavity 6.

Figure 11:
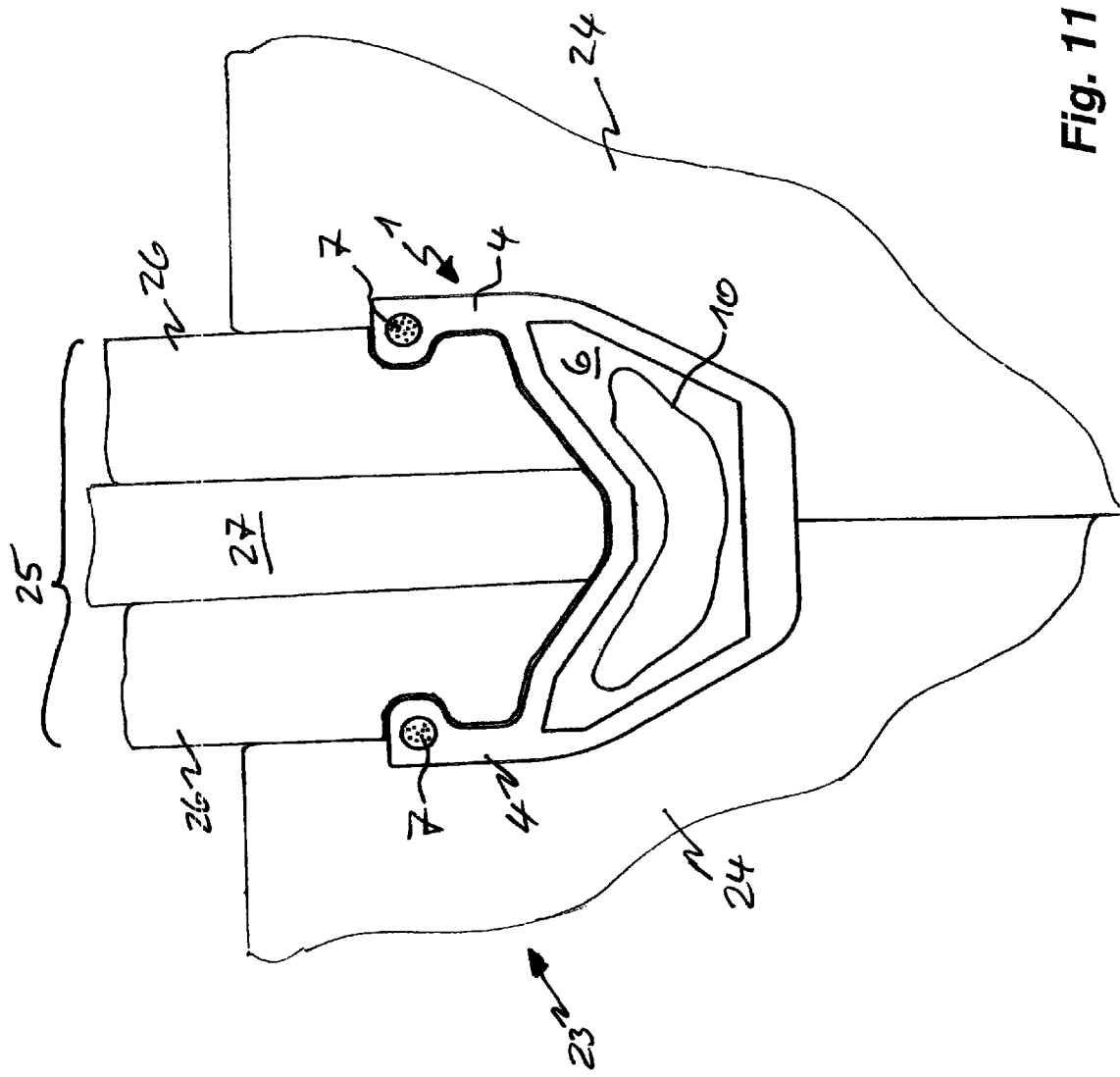

In FIG. 11, a multi-part negative mold 23 with two lateral mold halves 24 and several mold core pieces 25, distributed in the circumferential direction, are represented, whereby in the cross sectional representation only one of the mold core pieces 25 is visible. Each mold core piece 25 is composed on its part of two lateral partial cores 26 and a central partial core 27 lying between them. In the negative mold 23, a wheel rim 1 is shaped in one piece. A cavity 6 is inserted into this wheel rim 1 via a bladder 10.

The mold core pieces 25 are designed to have at least three parts in cross section, in order to be able to remove them without damaging the wheel rim 1 in the area of the rim sidewalls 4 designed as rim flanges. In order to accomplish this, the central partial core 27 is removed first, subsequently the two lateral partial cores 26 can first be moved somewhat laterally out of the undercut area and then be pulled out. By opening of the two mold halves 24, the wheel rim 1 can then be removed from the negative mold 23. Further post processing steps are not necessary in this case.

Because the entire wheel rim 1 is circularly shaped, several mold core pieces 25, mounted in a circumferential direction behind each other, have to be provided in order to be able to install them and remove them again. Therefore, at least two mold core pieces 25 spanning 180° are required. For the avoidance of shear forces during the casting of the fiber material in the negative mold 23, the mold core pieces 25 should each cover a lesser angle, so that a correspondingly larger number of mold core pieces 25 is required.

Figure 12:
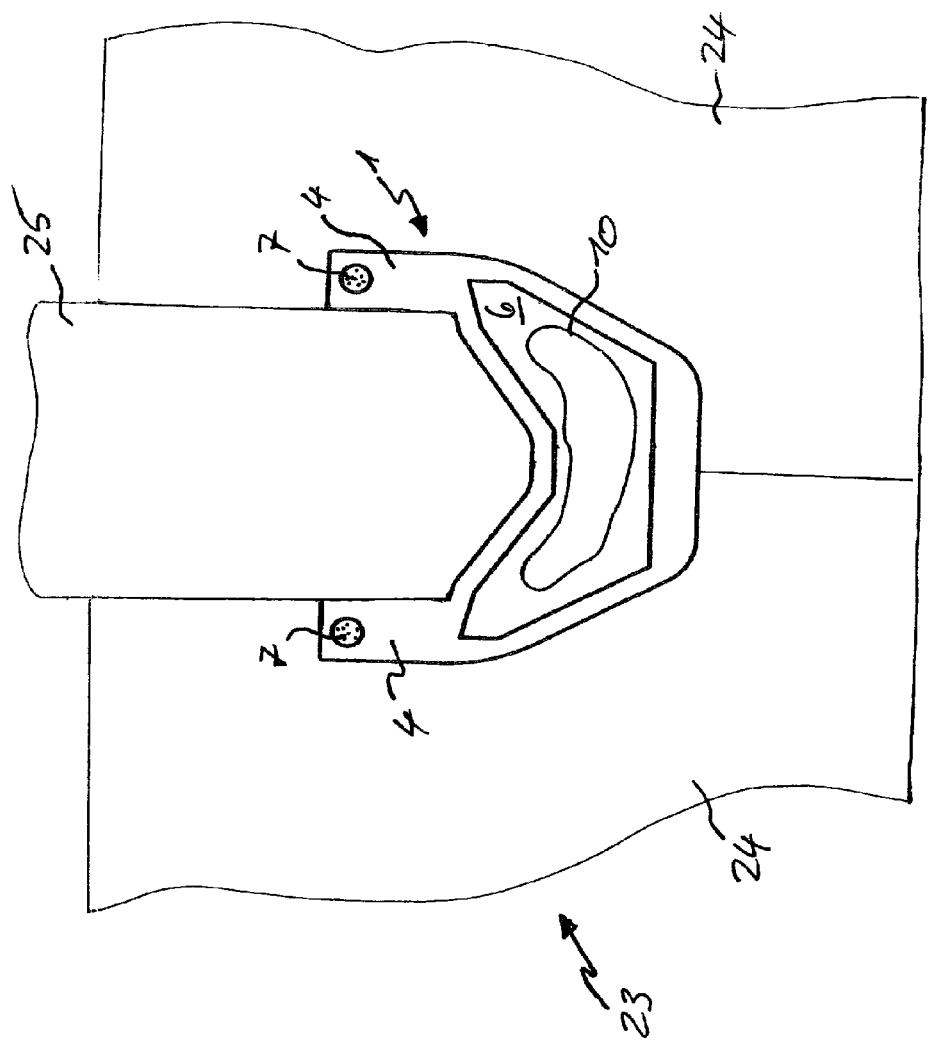

For the negative mold 23 according to FIG. 12, a single-piece (in cross section) mold core piece 25 is provided. This simplifies its construction as well as the insertion and removal; however, the rim sidewalls 4 of the wheel rim 1 have to be machine finished subsequent to the removal out of the negative mold 23 for the creation of the rim flanges. This can be achieved using a machining tool similar to the rotary grinder 20, or the angled cutting tool 21, or a shaping cutter (not shown) from FIGS. 10 and 14.

The wheel rims represented in the figures are each bicycle wheel rims. It is possible, however, to also construct wheel rims for other vehicles, particularly motorcycles or wheel chairs, in a similar manner.

What is claimed is:

1. A wheel rim comprising:
    a rim body having a rim well, the rim well being formed by fiber reinforced composite material and comprising two lateral rim sidewalls;
    wherein the two lateral rim sidewalls each include an end distal from the wheel well which forms a rim flange extending generally toward a central radial plane of the rim well, the rim flange comprising a generally annular ring located generally circumferentially around the rim body and adapted to increase strength and rigidity of the rim flange and thereby the wheel rim, the generally annular ring is enclosed by the fiber reinforced composite material which also extends at least to the corresponding lateral rim sidewall, the generally annular ring and associated rim flange is configured to create an undercut area between the rim flange and the rim sidewall adapted to engage a clincher tire.

2. The wheel rim according to claim 1, wherein the two lateral rim sidewalls extend between a base of the rim well and the rim flange.

3. The wheel rim according to claim 2, wherein the annular ring comprises at least one of aluminum and steel.

4. The wheel rim according to claim 2, wherein the annular rings comprises at least one of carbon fiber reinforced polymer (CFRP) fibers and fiber reinforced polymer.

5. The wheel rim according to claim 2, wherein each annular ring comprises reinforced fiber composite wherein the reinforced fibers comprise annular fiber groupings that extend circumferentially along the associated lateral rim sidewall.

6. The wheel rim according to claim 2, wherein the annular ring comprises at least one of monodirectional fibers and monodirectional fiber groupings.

7. The wheel rim according to claim 2, wherein the annular ring comprises at least one of plies of variously oriented fiber groupings and plies of variously oriented fiber mats.

8. The wheel rim according to claim 2, wherein the annular ring is formed of a plurality of ring segments.

9. The wheel rim according to claim 8, wherein the ring segments are positioned to at least partially overlap.

10. The wheel rim according to claim 2, wherein the annular ring comprises pre-tensioned fiber groupings.

11. The wheel rim according to claim 2, wherein the annular ring comprise rolled fiber mats.

12. The wheel rim according to claim 2, wherein the annular ring has a generally circular cross-section.

13. The wheel rim according to claim 2, wherein the annular ring has a varying radial cross-section over the course of the circumference.

14. The wheel rim according to one of the claim 2, wherein the annular ring is enclosed by fiber material which emanates from the associated lateral rim sidewalls and encloses the annular ring so that a portion of the fiber material projects generally inwardly from the associated lateral rim wall.

15. The wheel rim according to claim 2, wherein the wheel rim comprises at least two pieces.

16. The wheel rim according to claim 15, wherein the at least two pieces are generally symmetrical relative to a radial plane of the wheel rim.

17. The wheel rim according to claim 1, wherein the rim body is designed as a cavity rim and shows at least one cavity.

18. The wheel rim according to claim 15, wherein each of the at least two rim pieces is configured to form a cavity therein.

19. The wheel rim according to claim 18, wherein interiorly lying contact sides of the rim at least two rim pieces, which are symmetrical relative to the radial plane of the wheel rim, are configured to include cutouts each of which is separated from other cutouts by partition walls.

20. The wheel rim according to claim 19, wherein the partition walls and the cutouts of the at least two rim pieces, when these pieces are abutted against each other in the connected or standard position, are mounted offset from each other.

21. The wheel rim according to claim 2, wherein the wheel rim shows on its tire supporting side, which faces generally outwardly from the rim well, essentially radially protruding connecting flanges equally spaced from each other in the circumferential direction.

22. The wheel rim according to claim 21, wherein the connecting flanges each are configured to form an insertion opening oriented generally perpendicular to a flat central plane of the wheel rim.

23. The wheel rim according to claim 21, wherein at least one of the wheel supporting side and the rim well side of a peripheral side of the wheel rim is provided with fiber mats which cover over contact areas between the at least two rim pieces.

24. The wheel rim according to claim 19, wherein the partition walls are equidistantly located along the circumference between at least one of the the lateral rim sidewalls and a continuous support ring is located between the lateral rim sidewalls.

25. The wheel rim according to claim 23, wherein the wheel rim is any one of a bicycle wheel rim, a motorcycle wheel rim, and a wheel rim for a wheel chair.

26. A wheel rim comprising:
a rim body having a rim well, the rim well being formed by fiber reinforced composite material and comprising two lateral rim sidewalls;
wherein the two lateral rim sidewalls each include an end distal from the wheel well which forms a rim flange, the rim flange comprising a generally annular ring generally located circumferentially around the rim body and adapted to increase the strength and rigidity of the flange and thereby the wheel rim, the generally annular ring is enclosed by the fiber reinforced composite material which also extends at least to the corresponding lateral rim sidewall, the generally annular ring being located in proximate to an outer circumferential edge of the rim body, the generally annular ring and associated rim flange is configured to create an undercut area between the rim flange and the rim sidewall adapted to engage a clincher tire.

27. A wheel rim comprising:
the wheel rim comprising at least two parts each comprising:
a rim body having a rim well, the rim well being formed by fiber reinforced composite material and comprising two lateral rim sidewalls;
the two lateral rim sidewalls each include an end distal from the wheel well which forms a rim flange extending generally toward a central radial plane of the rim well, the rim flange comprising a generally annular ring generally located circumferentially around the rim body and adapted to increase the strength and rigidity of the rim flange and thereby the wheel rim, the generally annular ring is enclosed by the fiber reinforced composite material which also extends at least to the corresponding lateral rim sidewall, the generally annular ring and associated rim flange being configured to create an undercut area between the rim flange and the rim sidewall adapted to engage a clincher tire, the generally annular ring comprises annular fiber groupings that extend circumferentially along the associated lateral rim sidewall, annular fiber groupings comprising at least one of carbon fiber reinforced polymer (CFRP) fibers and fiber reinforced polymer;
wherein the annular ring is enclosed by fiber material which emanates from the associated lateral rim sidewalls and encloses the annular ring so that a portion of the fiber material projects generally inwardly from the associated lateral rim wall, at least one of the wheel supporting side and the rim well side of a peripheral side of the wheel rim is provided with fiber mats which cover over contact areas between the at least two rim pieces.

\* \* \* \* \*